United States Patent
Preischl et al.

(10) Patent No.: US 6,291,091 B1
(45) Date of Patent: Sep. 18, 2001

(54) CONTINUOUS METHOD FOR MANUFACTURING A LAMINATED ELECTROLYTE AND ELECTRODE ASSEMBLY

(75) Inventors: Christine Preischl, Kirchheim; Peter Hedrich, Mariabrunn; Alfred Hahn, Oer-Erkenschwick, all of (DE)

(73) Assignee: Ballard Power Systems Inc., Burnaby (CA)

( * ) Notice: Subject to any disclaimer, the term of this patent is extended or adjusted under 35 U.S.C. 154(b) by 0 days.

(21) Appl. No.: 09/216,207

(22) Filed: Dec. 18, 1998

Related U.S. Application Data

(60) Provisional application No. 60/068,797, filed on Dec. 24, 1997.

(51) Int. Cl.$^7$ ...................................................... H02M 8/10
(52) U.S. Cl. ................................................ 429/30; 429/33
(58) Field of Search .............................. 429/30, 33, 126; 427/115; 502/101

(56) References Cited

U.S. PATENT DOCUMENTS

| | | | |
|---|---|---|---|
| 4,157,432 | 6/1979 | Lundberg et al. | 526/31 |
| 4,437,952 | 3/1984 | Smith et al. | 204/98 |
| 4,645,602 | 2/1987 | Barnes, Jr. et al. | 210/490 |
| 4,954,388 | 9/1990 | Mallouk et al. | 428/198 |
| 5,290,642 | * 3/1994 | Minh et al. | 429/33 |
| 5,447,636 | 9/1995 | Banerjee | 210/638 |
| 5,536,278 | 7/1996 | St-Amant et al. | 29/623.3 |
| 5,599,614 | 2/1997 | Bahar et al. | 442/171 |
| 5,744,015 | * 4/1998 | Mazanec et al. | 204/295 |

FOREIGN PATENT DOCUMENTS

| | | |
|---|---|---|
| 195 09 749 A1 | 3/1995 | (DE) . |
| 195 09 748 C2 | 1/1997 | (DE) . |
| 0 736 921 A1 | 4/1996 | (EP) . |
| 0 718 903 A1 | 6/1996 | (EP) . |
| WO 97/23916 | 7/1997 | (WO) . |
| WO 97/23919 | 7/1997 | (WO) . |
| WO 97/47052 | 12/1997 | (WO) . |

OTHER PUBLICATIONS

Cylindrical Proton Exchange Membrane Fuel Cells and Methods of Making Same WO 97/47052, Dec. 1997.*

* cited by examiner

*Primary Examiner*—Gabrielle Brouillette
*Assistant Examiner*—M. Wills
(74) *Attorney, Agent, or Firm*—McAndrews, Held & Malloy, Ltd.

(57) ABSTRACT

A continuous method manufactures a laminated electrolyte and electrode assembly ("laminated assembly") comprising at least one pre-formed electrode layer, at least one catalyst layer and at least one electrolyte layer for an electrochemical cell. The method comprises forming at least one of the catalyst or electrolyte layers in situ and using it as a laminating medium. The method produces a laminated assembly in a continuous sheet, which may be later cut to size and shape for use in electrochemical cells. The method may comprise co-extruding granular catalyst and/or electrolyte materials. In one embodiment, the catalyst and electrolyte layers are co-extruded. The co-extruded tri-layer extrusion is laminated with immediately adjacent pre-formed electrode layers. In another embodiment the catalyst layer is extruded and the catalyst layer acts as the laminating medium between immediately adjacent pre-formed electrode and electrolyte layers. In a further embodiment the catalyst layers are applied to two separate pre-formed electrode layers, and the catalyst coated electrode layers are laminated with an electrolyte layer formed in situ which serves as the laminating medium.

21 Claims, 1 Drawing Sheet

CONTINUOUS METHOD FOR MANUFACTURING A LAMINATED ELECTROLYTE AND ELECTRODE ASSEMBLY

CCROSS-REFERENCE TO RELATED APPLICATION

This application is related to and claims priority benefits from U.S. Provisional Patent Application Serial No. 60/068,797 filed Dec. 24, 1997, entitled "A Continuous Method For Manufacturing a Laminated Electrolyte and Electrode Assembly". The '797 provisional application is incorporated herein by reference in its entirety.

FIELD OF THE INVENTION

The present invention relates to an improved method for manufacturing a continuous multi-layer laminated electrolyte and electrode assembly ("laminated assembly") for an electrochemical fuel cell.

BACKGROUND OF THE INVENTION

Electrochemical fuel cells convert fuel and oxidant to electricity and reaction product. Solid polymer electrochemical fuel cells generally employ a membrane electrode assembly ("MEA") in which an electrolyte in the form of an ion-exchange membrane is disposed between two electrode layers. The electrode layers are made from porous, electrically conductive sheet material, such as carbon fiber paper or carbon cloth. In a typical MEA, the electrode layers provide structural support to the membrane, which is typically thin and flexible.

The MEA contains an electrocatalyst, typically comprising finely comminuted platinum particles disposed in a layer at each membrane/electrode layer interface, to induce the desired electrochemical reaction. The electrodes are electrically coupled to provide a path for conducting electrons between the electrodes through an external load.

During operation of the fuel cell, at the anode, the fuel permeates the porous electrode layer and reacts at the electrocatalyst layer to form protons and electrons. The protons migrate through the ion-exchange membrane to the cathode. At the cathode, the oxygen-containing gas supply permeates the porous electrode material and reacts at the cathode electrocatalyst layer with the protons to form water as a reaction product.

In conventional fuel cells, the MEA is disposed between two electrically conductive plates, each of which typically has at least one flow passage formed therein. The flow passages direct the fuel and oxidant to the respective electrodes, namely, the anode on the fuel side and the cathode on the oxidant side. In a single cell arrangement, fluid flow field plates are provided on each of the anode and cathode sides. The fluid flow field plates act as current collectors, provide fuel and oxidant to the respective anode and cathode catalytic surfaces, and provide channels for the removal of exhaust fluid streams.

One known method for fabricating an MEA for use in an electrochemical fuel cell, is to use a heat-press to join together the MEA components. A disadvantage of this method is that heat-pressing the entire assembly, which comprises the porous electrode layers, catalyst material and solid polymer electrolyte, subjects each of these components to undesirable mechanical and thermal stresses. Such mechanical and thermal stresses can diminish the performance and lifetime of an MEA in an operating fuel cell.

Another disadvantage relates to the suitability of this known method for mass production. The heat-pressing procedure is typically a discontinuous or "batch" process. While the press is being heated, a layered structure comprising electrodes, catalyst layers, and a solid ion-exchange membrane, is typically inserted in a press, pressed therein, and subsequently removed from the press. This conventional batch procedure involves inefficient, costly and time-consuming process control.

German Patent DE 195 09 748 C2, discloses a generic process for producing a composite laminate comprising an electrode material, a catalyst material and a solid electrolyte material. The component materials are arranged on an electrostatically charged surface, and an external heater heats the solid electrolyte material until the upper side of the electrolyte material becomes soft. While the upper side of the electrolyte material is still soft, it is applied under pressure to the catalyst material for bonding the catalyst material to the polymer electrolyte. After the bond has set, the composite laminate is removed from the surface. A problem with this procedure is that the dimensions of the electrostatically charged surface limits the size of the MEA produced. A continuous sheet can not be manufactured according to this method.

Accordingly, there is a need for a continuous process for manufacturing a continuous laminated electrolyte-electrode assembly. A continuous process is desirable to improve efficiency by increasing productivity and the speed of the manufacturing process, thereby reducing production costs.

SUMMARY OF THE INVENTION

An objective of the present invention is to provide an improved continuous manufacturing method for producing a continuous multi-layer laminated assembly for use in electrochemical energy converters, particularly fuel cells, but also electrolyzers, and storage media (for example double layer capacitors). The laminated assembly includes first and second pre-formed electrode layers, an electrolyte layer interposed between the first and second electrode layers, a first catalyst layer interposed between the first electrode layer and a first major surface of the electrolyte layer, and a second catalyst interposed between the second electrode layer and a second major surface of the electrolyte layer. The electrolyte layer comprises an ionic electrolyte or an electrolyte precursor, which may be converted into an ionic form suitable as an electrolyte. The method involves forming at least one of the catalyst and electrolyte layers in situ and using the in situ formed layer as a laminating medium to bond the in situ formed layer with the two immediately adjacent pre-formed layers of the laminated assembly, thereby bonding two pre-formed layers of the laminated assembly together. The in situ formed layer preferably acts as the laminating medium while it is still soft or in a formable state when the layers of the laminated assembly are pressed together.

In one embodiment of the method, the first and second catalyst layers, and the electrolyte layer are all formed in situ by a tri-layer extrusion process. The opposing major surfaces of the tri-layer extrusion act as the laminating media for bonding the tri-layer extrusion to the immediately adjacent pre-formed electrode layers. The tri-layer extrusion may be produced by a multiple channel, single slit extrusion die. Suitable catalyst mixtures and electrolyte materials (or electrolyte precursor materials) may be continuously fed into separate intake chambers of an extrusion assembly. These materials are preferably in the form of granules or a paste. Each of the intake chambers is fluidly connected with one of the channels in the extrusion die.

The material selected for the electrolyte layer is suitable as an ion-exchange layer in an electrochemical cell, or is a precursor electrolyte material that is transformable into a ion-exchange layer. For example, a precursor material could be converted from a non-ionic to an ionic form after being extruded, using known methods such as, for example, hydrolysis.

The manufactured electrolyte layer preferably has the following properties:
- substantially impermeable to reactant fluids;
- ion conductor;
- electrical insulator; and
- substantially inert in an electrochemical fuel cell environment.

In the laminated assembly, the electrolyte layer may assume a solid form or remain in the form of a gel or a paste. The electrolyte material is preferably polymeric, but it could also be non-polymeric so long as it has the above-identified properties. Some examples of some preferred electrolyte materials are perfluorosulfonic acid based materials such as Nafion™, polyetheretherketoneketone (poly(oxy-1,4-phenyleneoxy-1,4-phenylenecarbonyl-1,4-phenylene), commonly referred to as PEEKK) based ion conducting polymers, sulfonated polytrifluorostyrene based ion conducting polymers, such as BAM™ polymer.

The catalyst mixture may comprise catalyst particles and a binder material. The binder material is preferably compatible for bonding with the electrolyte layer and may be the same as a material used in the electrolyte layer. The catalyst mixture may also include additives that enhance the desired properties of the catalyst layer, such as fluid transport properties, permeability, ionic conductivity, and electrical conductivity. Using the described method it is possible to use different catalyst mixture compositions for the two catalyst layers, by depositing different catalyst mixtures into the separate extrusion assembly chambers.

Following the co-extrusion step, the tri-layer extrusion is continuously deposited between two pre-formed electrode sheets. The electrode sheets may be continuous strips of material fed from rolls. The electrode layers preferably comprise flexible carbon cloth or carbon paper sheet material having a longitudinal breaking load no less than 30 N/50 mm. The tri-layer extrusion is thus interposed between the pre-formed electrode sheets and bonded thereto. Preferably the laminated assembly is passed between opposing calender rolls which press the layers together. The product of the method is a continuous laminated assembly which may be wound onto a roll for storage, or fed into further manufacturing processes, such as for example, a cutting machine for cutting the laminated assembly into the desired size and shape.

In a second embodiment of the method, only the catalyst layers are formed in situ and they serve as the laminating medium. In this embodiment, the electrolyte and electrode layers are preferably pre-formed sheets dispensed from rolls. The anode catalyst and the cathode catalyst mixtures are continuously extruded and deposited between the electrolyte sheet and the respective porous electrode sheets.

The laminated assembly is preferably passed between at least one pair of calender rolls to press the layers together. The insertion of the catalyst layers may be done sequentially or simultaneously. If the insertion is done sequentially, after each catalyst layer is inserted, the laminated assembly may be passed through a laminating machine having a pair of calender rolls.

In the second embodiment, the method preferably employs a tandem extrusion assembly that has separate chambers and extrusion dies for the first and second catalyst mixtures. The first and second catalyst mixtures may be different in composition and are preferably fed into the extrusion assembly in granular or paste form.

In a third embodiment, the electrolyte layer serves as the laminating medium. The anode and cathode catalyst mixtures are first applied to respective anode and cathode sheets. Alternatively, the pre-formed electrodes may be pre-coated with a catalyst layer. There are several known methods for applying the catalyst layers to the electrode sheets. For example, there are known methods for spraying, screen-printing, or rolling the catalyst onto the electrode sheets.

The electrolyte layer is extruded and formed in situ between the coated anode and cathode sheets. Then the laminated assembly is fed through a pair of calender rolls to press the layers together to complete the lamination procedure. The method may further comprise the step of treating the laminated assembly to convert the precursor electrolyte material into an ionic form, in the same manner that has been disclosed with respect to the first embodiment of the method.

There are several advantages to using the described method. For example, an advantage of using at least one of the layers of the laminated assembly as the laminating medium, is that there is no need for additional steps for bonding the individual layers together (i.e. no need for heat pressing, or applying and later removing solvents, or using adhesives).

An advantage of using an extrusion process is that an extrusion layer thickness of between 2 $\mu$m and 250 $\mu$m is possible. Accordingly, a catalyst layer thickness of $\leq 10$ $\mu$m may be selected to reduce the amount of expensive noble metal employed.

Furthermore, the co-extrusion step may be designed to prevent any significant intermixing of the electrolyte and catalyst layers of the laminated assembly.

Yet another advantage of the present method is the production speeds that may be achieved. For similar processes, production speeds of up to 400 m/min are attainable. While the three described embodiments comprise extruding the laminating medium, other methods of forming coating layers such as spray coating, brush coating, and rolling are also contemplated as methods of forming the laminating medium in situ.

BRIEF DESCRIPTION OF THE DRAWINGS

The advantages, nature and additional features of the invention will become more apparent from the following description, taken in connection with the accompanying drawings, in which.

DETAILED DESCRIPTION OF PREFERRED EMBODIMENTS

The invention relates to improved methods of manufacturing a laminated assembly for use in electrochemical fuel cells. The method involves using at least one of the electrolyte or catalyst layers as a laminating media for the laminated assembly. The method preferably employs a calender process combined with an extrusion process to produce a laminated assembly in a continuous sheet.

Figure 1:
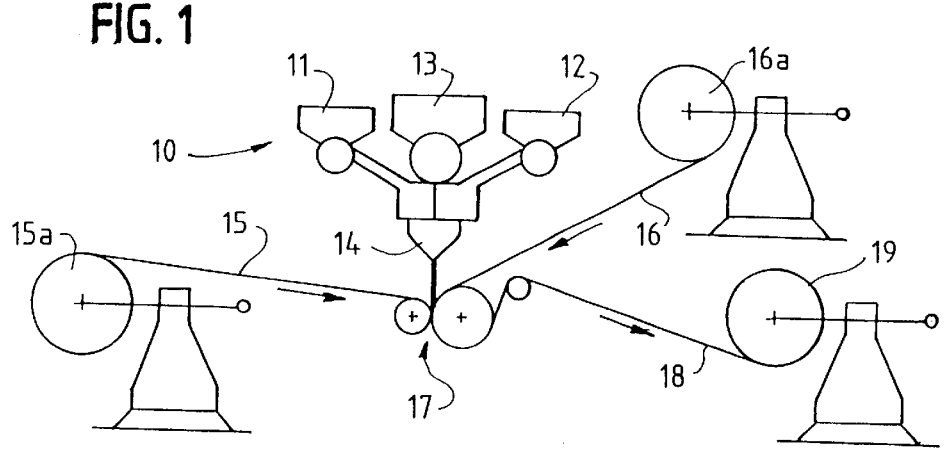
FIG. 1 schematically illustrates the manufacture of a laminated assembly in accordance with a first embodiment of an improved continuous method of manufacture.

In a first embodiment, shown in FIG. 1, co-extrusion assembly 10 provides a tri-layer electrolyte-catalyst extrusion which is deposited between two electrode sheets 15, 16 which are drawn from respective rolls 15a, 16a.

Co-extrusion assembly 10 is equipped with three intakes 11, 12, 13 for receiving catalyst and electrolyte materials, which may be in granular or paste form. Preferably, in practice center intake 13 is charged with a precursor to an ionic electrolyte (for example, non-ionomeric polymer granulates). Outer intakes 11, 12 are charged with suitable granulates which comprise the anode catalyst and the cathode catalyst, respectively. The anode catalyst may be different in composition from the cathode catalyst. Instead of granulates, outer intakes 11, 12 may be charged with a paste mixture of catalyst and for example, polymer electrolyte solution which is extrudable and which may serve as the laminating media.

Inside co-extrusion assembly 10 there are three screw feeders (not shown) and a multiple channel single slit extrusion die 14 from which emerges the co-extruded tri-layer extrusion which comprises anode and cathode catalyst layers with a polymer electrolyte layer disposed therebetween.

The tri-layer extrusion emerging from extrusion die 14 is deposited between two electrode sheets 15, 16, while the anode and cathode catalyst layers are still soft from the extrusion process. Electrode sheets 15, 16 may be made from flexible non-woven carbon fiber paper, carbon fiber cloth, or some other porous, electrically conductive material.

The tri-layer extrusion, interposed between electrode sheets 15, 16, is fed to laminator station 17 which comprises at least one pair of calender rolls. Laminator station 17 laminates the tri-layer extrusion with electrode sheets 15, 16 forming continuous laminated assembly sheet 18 which may be rolled onto storage roll 19.

Figure 2:
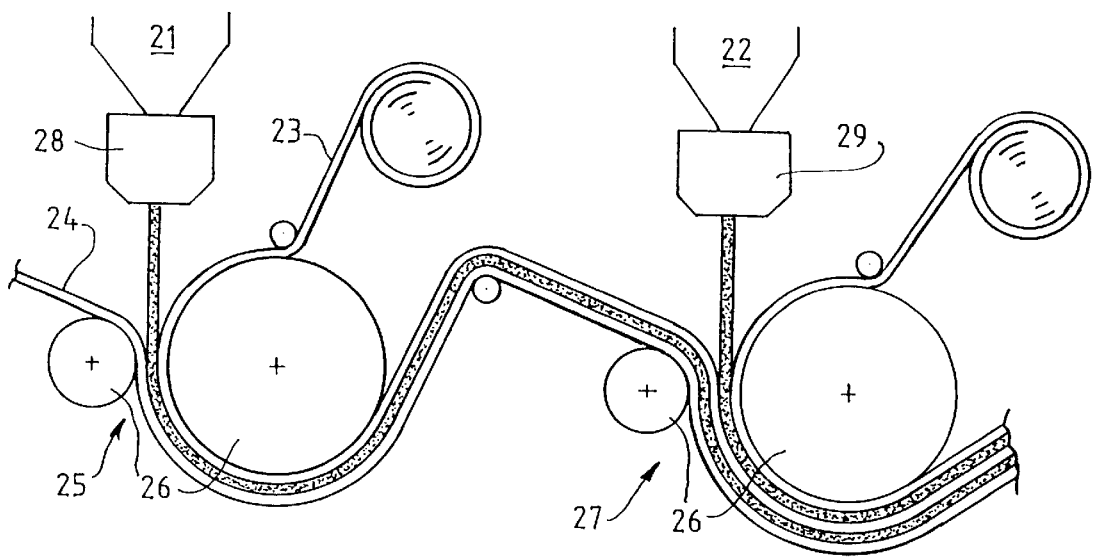
FIG. 2 schematically illustrates the manufacture of a laminated assembly in accordance with a second embodiment of an improved continuous method of manufacture.

In a second embodiment, illustrated by FIG. 2, the method employs tandem extrusion assembly 20, which deposits catalyst layers between pre-formed membrane electrolyte sheet 23 and pre-formed electrode sheets in two separate laminating stages.

Tandem extrusion assembly 20 is equipped with two intakes 21, 22. Each intake 21, 22 supplies a respective one of extruders 28, 29 with anode catalyst and cathode catalyst granulates.

In this second embodiment, the anode catalyst layer is extruded in extruder 28 between electrode sheet 24 and membrane electrolyte 23 which is drawn from a storage roll. The anode catalyst layer interposed between electrode sheet 24 and membrane electrolyte 23 is fed into laminator station 25 and laminated therein.

The laminated sheet produced by laminator station 25 is fed into second laminator station 27 together with a second electrode sheet and the cathode catalyst layer interposed therebetween by extruder 29. The laminate leaving laminator station 27 is a continuous laminated assembly sheet manufactured in accordance with the invention and may be fed to a storage roll (not shown).

Each of laminator stations 25 and 27 comprise at least one pair of calender rolls 26 for pressing the component sheets together with the laminating medium interposed therebetween.

In this second embodiment, the two catalyst layers serve as the laminating medium between the pre-formed electrode sheets and the centrally located pre-formed membrane electrolyte 23.

The granulate fed into extrusion assembly intakes 21 and 22 preferably comprises a mixture of catalyst and polymer materials. For example, if the catalyst is platinum (Pt), the granulate mixture should comprise between 1% and 40% Pt where the desired catalyst loading is 0.1 mg/cm$^2$ Pt. The remainder of the granulate mixture may comprise precursors to a polymer electrolyte, electrically conductive particles, and other additives, such as pore forming agents. With different catalytic materials, other proportions may be preferred depending upon the desired loading. In a preferred embodiment, using Pt, this percentage is approximately 10% Pt to obtain a loading between 0.1–4.0 mg/cm$^2$ Pt, preferably of 1.0 mg/cm$^2$ for the catalyst layers.

The extrusion process may involve heating and melt-processing the granulate materials. Therefore, to practice the method where at least one of the precursor catalyst and/or electrolyte layers are heat extruded, to avoid hazardous conditions the granulate materials preferably do not contain any volatile components. For polymer electrolytes and their precursors, suitable processing temperatures typically range from 150° C. to 350° C. More commonly, to avoid decomposition of typical polymer electrolyte materials, the preferred processing temperature range is about 180° C. to 185° C.

Alternatively, a cold extrusion process may be used where the extruded material is in the form of a paste or slurry mixture.

Figure 3:
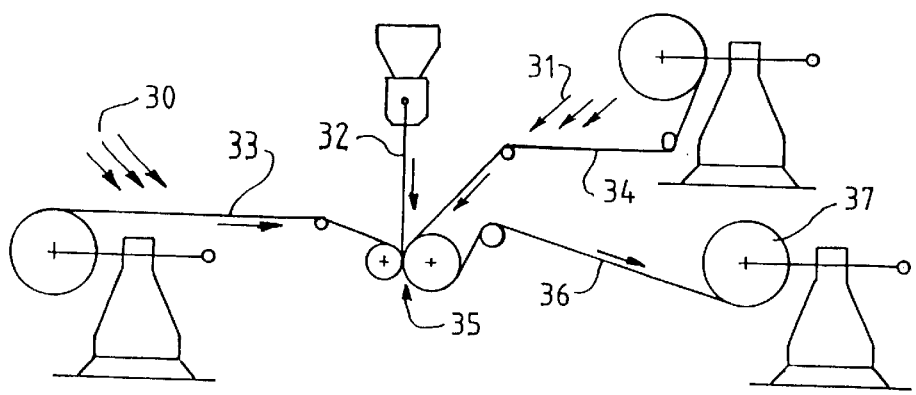
FIG. 3 schematically illustrates the manufacture of a laminated assembly in accordance with a third embodiment of an improved continuous method of manufacture.

In a third embodiment, illustrated by FIG. 3, the method of the invention comprises first depositing the catalyst layers on electrode sheets 33, 34. The catalyst coated electrode sheets 33, 34 are then laminated with the electrolyte layer, with the electrolyte layer being formed in situ and acting as the laminating medium.

As shown by FIG. 3, two pre-formed electrode sheets 33 and 34 are drawn from respective storage rolls. Electrode sheets 33 and 34 then pass through respective coating or primer stations 30 and 31, in which respective anode and cathode catalyst layers are applied to the electrode sheets 33 and 34. Coating stations 30 and 31 are known to those skilled in the art and have only been indicated by three arrows, respectively, to simplify the representation of this known procedure. For example, coating stations 30 and 31 may comprise a rolling application, a spray application, screen printing or other known methods. Coating stations 30 and 31 may also include a secondary drying stage.

After electrode sheets 33 and 34 have been coated with respective catalyst layers, an electrolyte material, or a precursor material to the electrolyte, is extruded between catalyst-coated electrode sheets 33 and 34. The laminated assembly is then fed into laminating station 35 where the assembly is laminated together. Laminating station 35 comprises at least one pair of calender rolls, which press the component sheets together with the laminating medium interposed therebetween. In this embodiment, electrolyte layer 32, typically an electrolyte precursor material, acts as the laminating medium. The laminated assembly can then be fed to storage roll 37 or to further manufacturing processes.

In any of the embodiments of the method, one of the further manufacturing processes may include the step of converting a non-ionic electrolyte precursor material to an ionic electrolyte form, using known methods, such as hydrolysis.

Furthermore, in some cases it is desirable to formulate the anode catalyst differently from the cathode catalyst to improve the efficiency of the respective catalyst, for example, for use with different fuels or oxidants in a fuel cell.

In preferred embodiments, because the electrode sheets are dispensed from and stored on rolls, and held in tension through the laminating process, it is desirable for the electrode sheets to be formed from a flexible, break-resistant carbon material such as carbon fiber paper or cloth. The desired breaking load for the electrode sheet material depends upon the tension and winding speed of the laminating machine. For example, for laminating machines operating at production speeds up to 400 m/min., the longitudinal breaking load of flexible carbon fiber paper or cloth used as electrode sheets is preferably not lower than 30 N/50 mm.

It will be understood by those skilled in the art that the term "continuous", in relation to the method describes a method, such as a reel-to-reel process, that produces a continuous sheet which may be wound onto a roll. The laminated assembly is later cut to the desired shape and size for use in electrochemical cells. Of course, when materials for some of the layers are pre-formed and supplied from rolls, or when the finished laminated assembly is wound onto a roll, such a continuous method may need to be periodically interrupted to switch rolls.

The calender rolls used in the laminating step may also be equipped with means for forming openings in the laminated assembly. For example, one of the calender rolls may have cutting blades for forming a hole to accommodate an internal manifold and/or an internal tie rod in a fuel cell stack.

While particular elements, embodiments and applications of the present invention have been shown and described, it will be understood, of course, that the invention is not limited thereto since modifications may be made by those skilled in the art, particularly in light of the foregoing teachings. It is therefore contemplated by the appended claims to cover such modifications that incorporate those features coming within the spirit and scope of the invention.

What is claimed is:

1. A continuous method for manufacturing a continuous multi-layer laminated assembly for an electrochemical cell, said laminated assembly comprising:
   first and second pre-formed electrode layers;
   an electrolyte loayer interposed between said first and second electrode layers, wherein said electrolyte layer comprises an electrolyte or an electrolyte precursor;
   a first catalyst layer interposed between said first electrode layer and a first major surface of said electrolyte layer; and
   a second catalyst layer interposed between said second electrode layer and a second major surface of said electrolyte layer;
   said method comprising the steps of:
   (a) forming at least one of said electrolyte or catalyst layers in situ; and
   (b) using said at least one in situ formed layer as a laminating medium to bond two adjacent pre-formed layers of said laminated assembly.

2. The method of claim 1 wherein said first catalyst layer and said second catalyst layer comprise different catalyst compositions.

3. The method of claim 1 wherein said first and second pre-formed electrode layers comprise flexible carbon cloth or carbon paper.

4. The method of claim 1 wherein said electrode layers have a longitudinal breaking load no less than 30 N/50 mm.

5. The method of claim 1 further comprising the step of winding said laminated assembly onto a roll.

6. The method of claim 1 wherein step (a) comprises co-extruding a tri-layer extrusion comprising said first and second catalyst layers and said electrolyte layer interposed therebetween, and step (b) comprises using said tri-layer extrusion as said laminating medium between said pre-formed first and second electrode layers.

7. The method of claim 6 further comprising passing said multi-layer laminated assembly through opposing calender rolls which press said layers together.

8. The method of claim 6 wherein step (a) comprises deriving at least one of said first catalyst layer, said electrolyte layer, and said second catalyst layer, from a granulate material which is directed into a co-extrusion assembly.

9. The method of claim 6 wherein step (a) comprises deriving at least one of said first catalyst layer, said electrolyte layer, and said second catalyst layer, from a paste material which is directed into a co-extrusion assembly.

10. The method of claim 8 wherein said co-extrusion assembly comprises a multiple channel single slit extrusion die for making said tri-layer extrusion.

11. The method of claim 8 wherein each of said first catalyst layer, said electrolyte layer, and said second catalyst layer, are fabricated from respective granular materials which are each directed into respective intakes of said co-extrusion assembly.

12. The method of claim 6 further comprising the step of converting an electrolyte precursor to an ionic electrolyte after said layers of said laminated assembly have been bonded together.

13. The method of claim 12 wherein said ionic electrolyte is selected from the group consisting of perfluorosulfonic acid based materials, polyetheretherketoneketone based ion conducting polymers and sulfonated polytrifluorostyrene based ion conducting polymers.

14. The method of claim 1 wherein said electrolyte layer is pre-formed, and step (a) comprises extruding said first and second catalyst layers, and step (b) comprises using said first and second catalyst layers as said laminating medium to bond opposing major surfaces of said pre-formed electrolyte layer to said pre-formed first and second electrode layers respectively.

15. The method of claim 14 wherein said method further comprises the steps of:
   extruding a first catalyst mixture to form a first catalyst layer between said first electrode layer and said first major surface of said electrolyte layer;
   passing said first electrode layer, said first catalyst layer, and said electrolyte layer between a pair of calender rolls;
   extruding a second catalyst mixture to form a second catalyst layer between said first electrode layer and said first major surface of said electrolyte layer; and passing said second electrode layer, said second catalyst layer, and said electrolyte layer between a pair of calender rolls.

16. The method of claim 14 further comprising the step of introducing at least one of said first catalyst mixture and said second catalyst mixture, into an extrusion assembly as a granular material.

17. The method of claim 14 wherein said first catalyst mixture and said second catalyst mixture are directed as granules into separate intakes of a tandem extrusion assembly.

18. The method of claim 1 wherein step (a) comprises extruding said electrolyte layer, and step (b) comprises using said electrolyte layer as said laminating medium to bond opposing major surfaces of said electrolyte layer with immediately adjacent pre-formed layers of said laminated assembly.

19. The method of claim 18 further comprising the steps of continuously:

coating a first major surface of said first electrode layer with a first catalyst mixture to form said first catalyst layer;

coating a first major surface of said second electrode layer with a second catalyst mixture to form said second catalyst layer; and subsequently extruding said electrolyte layer to form, in situ, a layer between said catalyst coated major surfaces of said first and second electrode layers.

20. The method of claim 19 further comprising the step of converting an electrolyte precursor to an ionic electrolyte after said layers of said laminated assembly have been bonded together.

21. The method of claim 20 wherein said ionic electrolyte is selected from the group consisting of perfluorosulfonic acid based materials, polyetheretherketoneketone based ion conducting polymers and sulfonated polytrifluorostyrene based ion conducting polymers.

* * * * *